May 1, 1956

O. L. ASBURRY, JR 2,743,791

DEVICE TO PREVENT OVER EXPANSION OF BRAKE
SHOES IN HYDRAULIC BRAKE SYSTEMS
Filed Nov. 6, 1952

INVENTOR.
Omar Lee Asburry, Jr.

BY *Victor J. Evans & Co.*

ATTORNEYS

United States Patent Office 2,743,791
Patented May 1, 1956

2,743,791

DEVICE TO PREVENT OVER EXPANSION OF BRAKE SHOES IN HYDRAULIC BRAKE SYSTEMS

Omar Lee Asburry, Jr., Roanoke, Va.

Application November 6, 1952, Serial No. 319,121

3 Claims. (Cl. 188—78)

This invention relates to brakes of motor vehicles and in particular a device connecting the free ends of brake shoes in a brake drum to permit normal brake expansion and to prevent over expansion of the brake shoes when the brake drum is no longer in position to confine the brake shoes as when the wheel is lost due to some accidental cause, and an attempt is made to apply the brakes, as will be later explained.

The purpose of this invention is to prevent accidents due to lack of brakes resulting from broken brake drums, wheels running off of axles or spindles, broken spindles or axles, breaking of rear axle lock or rear axle housing or twisting off of the end of an axle or housing in which case the brake fluid is released and the system depleted thereof.

Upon accidental breaking of a brake drum or other damage to parts of a motor vehicle as noted the entire brake system is released due to over expansion of the brake shoes upon the application of the brake. With this thought in mind this invention contemplates a safety device for preventing over expansion of the brake shoes in case of an accident whereby the brake system of the remaining wheels of the vehicle is retained in an operative condition.

The object of this invention is, therefore, to provide means for preventing over expansion of brake shoes in hydraulic brake systems when parts of a vehicle in which the brake system is installed are accidently damaged.

Another object of the invention is to provide an adjustable device for limiting outward movement of brake shoes of a hydraulic brake system in which the device may readily be installed in brake drums now in use.

A further object of the invention is to provide a safety device for preventing over expansion of brake shoes in which the device is of a simple and economical construction.

With these and other objects and advantages in view the invention embodies a bracket having a stationary anchor extended from one end with an adjustable anchor extended from the opposite end, with the adjustable anchor provided with an adjusting nut and with the adjustable anchor connected to the stationary anchor with a spring.

Other features and advantages of the invention will appear from the following description taken in connection with the drawing, wherein.

Figure 1:
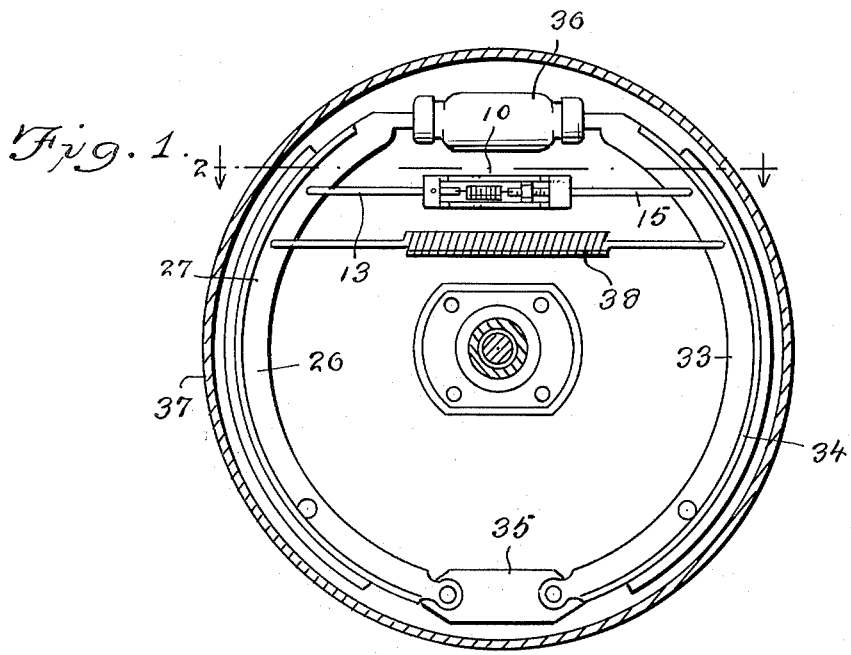
Figure 1 is a vertical section through a brake drum of a motor vehicle showing the mounting of brake shoes therein and showing the safety device of this invention connected to the brake shoes.
Figure 2:
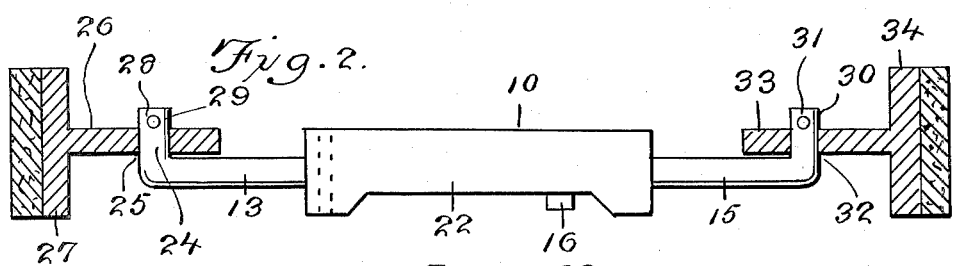
Figure 2 is a sectional plan through the upper part of the brake drum taken on line 2—2 of Fig. 1 and in which the parts are shown on an enlarged scale.
Figure 3:
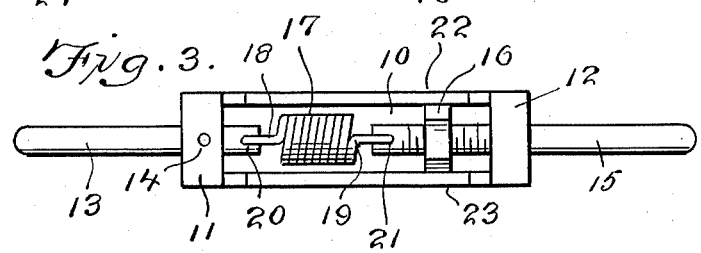
Figure 3 is a front elevational view of the improved safety device.
Figure 4:
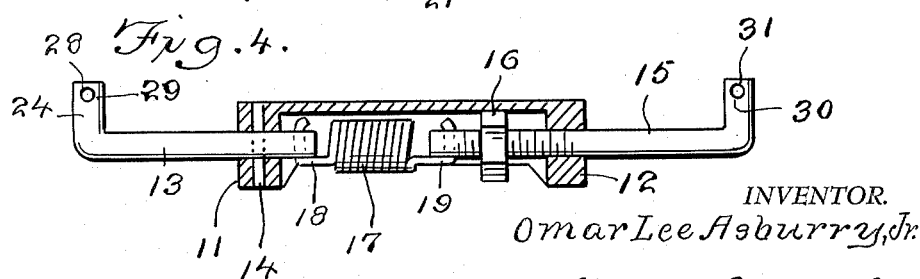
Figure 4 is a sectional plan through the device with the bracket shown in section and with the anchor elements, spring and adjusting nut shown in elevation.

Referring now to the drawing wherein like reference characters denote corresponding parts the hydraulic brake lock of this invention includes a bracket 10 having a base with end walls 11 and 12, an L-shaped bar 13 providing a stationary anchor and secured in the end wall 11 with a pin 14, an L-shaped bar 15 slidably mounted in the end wall 12 and having an adjusting nut 16 threaded thereon, and a spring 17 positioned in the bracket and having loops 18 and 19 at the ends which extend through openings 20 and 21, respectively in the ends of the anchors.

The bracket 10 is provided with side flanges 22 and 23 connecting the end walls 11 and 12 and the inner ends of the anchors and also the spring and adjusting nut are positioned between the side walls or flanges.

The extended end of the stationary anchor 13 is bent to form a pin 24 that is adapted to extend through an opening 25 in a web 26 of a brake shoe 27 and the pin 24 is retained in the web with a pin 28 that extends through an opening 29 in the pin 24.

The adjustable anchor 15 is similar to the anchor 13, the extended end thereof having a pin 30 with an opening 31 extended through the end thereof, and the pin 30 is adapted to extend through an opening 32 in a web 33 of a brake shoe 34.

With the brake shoes 27 and 34 pivotally connected at one end by a link 35 and actuated by a hydraulic unit 36 in a brake drum 37 the safety device of this invention is installed above the conventional spring 38 that urges the brake shoes inwardly toward the center and with the parts installed as illustrated in Fig. 1, the adjusting nut 16 is positioned to permit normal expansion of the brake shoes and to provide a stop preventing over expansion of the shoes. By this means it is possible to maintain the remaining portion of the hydraulic system in operative condition.

It will be understood that modifications, within the scope of the appended claims, may be made in the design and arrangement of the parts without departing from the spirit of the invention.

What is claimed is:

1. In a device for preventing the over expansion of the brake shoes in hydraulic brake systems, the combination which comprises an elongated bracket, a stationary anchor mounted in and extended from one end of said bracket, an adjustable anchor slidably mounted in and extended from the opposite end of the bracket, a spring connecting the adjustable anchor to the stationary anchor, a nut threaded on the adjustable anchor for limiting outward movement thereof from the bracket and pins on extended ends of the anchors for connecting the anchors to brake shoes in brake drums of brake systems.

2. In a device for preventing the over expansion of the brake shoes in hydraulic brake systems, the combination which comprises an elongated bracket, a stationary anchor mounted in and extended from one end of said bracket, an adjustable anchor slidably mounted in and extended from the opposite end of the bracket, a spring connecting the adjustable anchor to the stationary anchor, a nut threaded on the adjustable anchor for limiting outward movement thereof from the bracket and pins on extended ends of the anchors for connecting the anchors to brake shoes in brake drums of brake systems, said pins at the ends of the anchors having openings therethrough for securing the pins in said brake shoes.

3. In a device for preventing the over expansion of the brake shoes in hydraulic brake systems, the combination which comprises an elongated bracket having a base with end walls, an L-shaped stationary anchor fixedly mounted in one of the end walls of the bracket and extended therefrom, an L-shaped adjustable anchor slidably mounted in the end wall at the opposite end of the bracket and extended from the bracket, said adjustable anchor having a threaded section on the end extended into the bracket, a spring connecting the adjustable anchor to the stationary anchor for urging the adjustable anchor into the bracket, and a nut threaded on said adjustable anchor for limiting outward movement thereof from the bracket.

References Cited in the file of this patent

UNITED STATES PATENTS

| | | |
|---|---|---|
| 1,460,803 | Portzer | July 3, 1923 |
| 1,969,872 | Bowen | Aug. 14, 1934 |
| 2,063,618 | Oliver | Dec. 8, 1936 |
| 2,153,042 | Graziano et al. | Apr. 4, 1939 |
| 2,522,181 | Krikorian | Sept. 12, 1950 |
| 2,593,940 | Van Meter | Apr. 22, 1952 |